United States Patent [19]

Haynes et al.

[11] Patent Number: 4,605,084
[45] Date of Patent: Aug. 12, 1986

[54] CONSTANT MESH GEAR TRANSMISSION

[75] Inventors: Hendrick W. Haynes, Seattle, Wash.; Harry W. Mayer, 7414 218th St., SW., Edmonds, Wash. 98020

[73] Assignee: Harry W. Mayer, Edmonds, Wash.

[21] Appl. No.: 545,051

[22] Filed: Oct. 20, 1983

[51] Int. Cl.⁴ .................................... F16H 37/06
[52] U.S. Cl. ............................ 180/70.1; 180/233
[58] Field of Search ................... 180/70.1, 233; 74/665 T, 665 G, 333

[56] References Cited
U.S. PATENT DOCUMENTS 2,959,237 11/1960 Hill ........................................ 180/70.1
2,978,054 4/1961 Kraus .................................... 180/70.1
3,167,149 1/1965 Miller et al. ......................... 180/70.1
3,788,164 1/1974 Ojima ................................... 74/665 T Primary Examiner—Richard A. Bertsch
Attorney, Agent, or Firm—Harvey B. Jacobson

[57] ABSTRACT

The input, driven and counter shafts journaled in a gear transfer case are drivingly interconnected by constant mesh gearing and under control of a clutch mounted on each of the split power shafts. Fluid power controls effect selective engagement and disengagement of the clutches to transmit torque at high and low drive ratios for either two wheel or four wheel drive of a vehicle.

18 Claims, 7 Drawing Figures

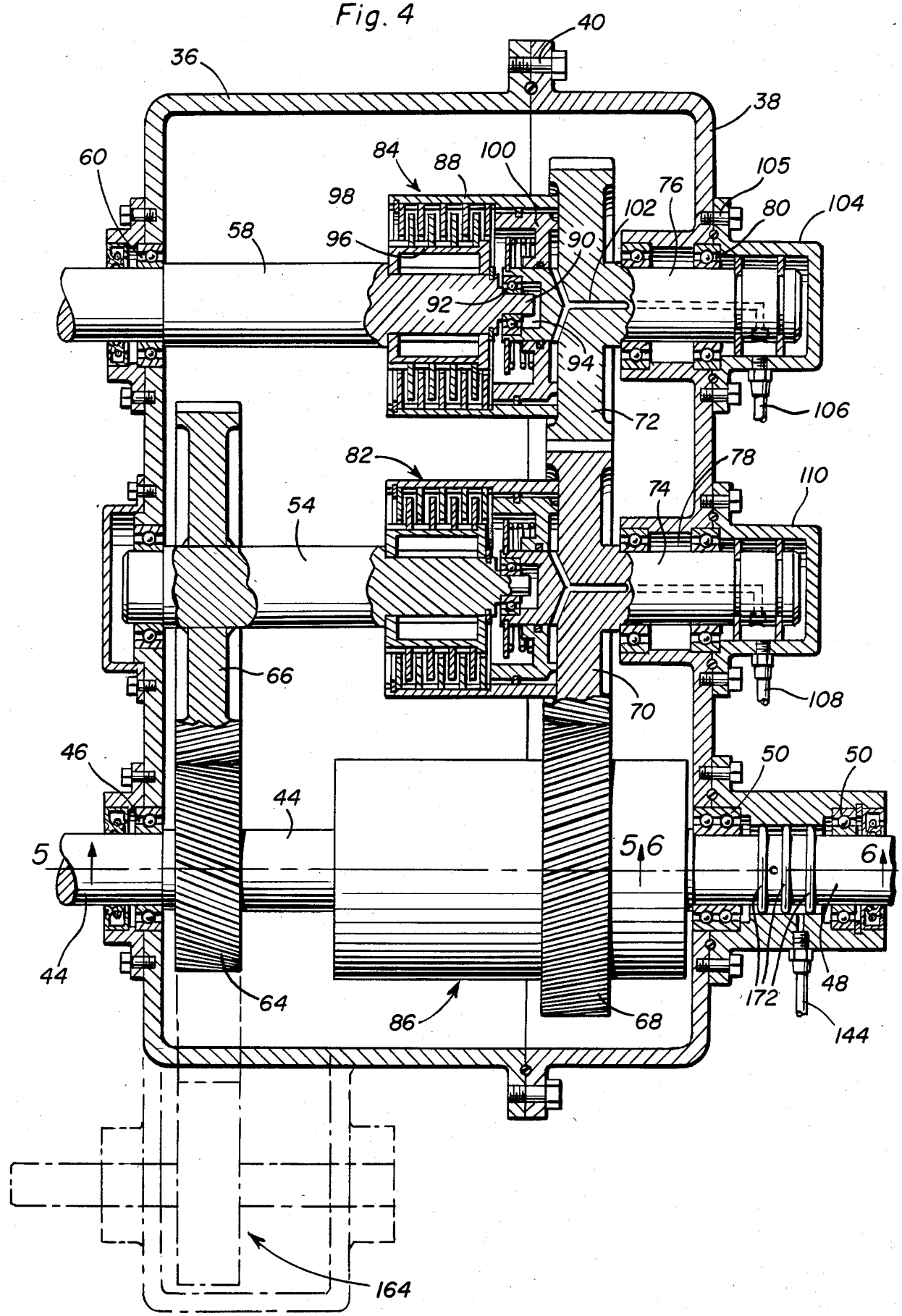

4,605,084

CONSTANT MESH GEAR TRANSMISSION

BACKGROUND OF THE INVENTION

This invention relates to a transfer gear transmission through which torque is transmitted to one or two driven shafts.

Transfer gear assemblies of the foregoing type are generally utilized in automotive vehicle installations for selective two-wheel or four-wheel drive. Often, any shift between such two-wheel and four-wheel drive operations requires momentary slow down or stopping of the vehicle in order to interrupt torque transmission during the shift. Further, additional supplemental gearing is required in order to provide for more than one speed ratio between the input and driven shafts of the transfer gear assembly.

It is therefore an important object of the present invention to provide a transfer gear assembly capable of shifting between drive of one and two driven shafts and at plural speed ratios for each driven shaft without auxiliary gearing and without interruption in torque transmission.

SUMMARY OF THE INVENTION

In accordance with the present invention, selectively controlled clutches are mounted on each of the input driven shafts and counter shafts associated with a transfer gear case transmission which includes countershaft gearing between the input and counter shafts and constant mesh gearing selectively coupled by the clutches to each of the input shaft, counter shaft and one of two driven shafts. By engaging different combinations of clutches, drive of one or both driven shafts, at direct or reduction gear ratios may be effected by displacement of a control valve from a neutral position to four different drive positions.

In accordance with one embodiment of the invention, one of the clutches directly coupling the input shaft and one of the driven shafts is engaged under a spring bias and disengaged by fluid pressure operating means. Spring biased clutch engagement may also be augmented by a fluid power assist device.

These together with other objects and advantages which will become subsequently apparent reside in the details of construction and operation as more fully hereinafter described and claimed, reference being had to the accompanying drawings forming a part hereof, wherein like numerals refer to like parts throughout.

BRIEF DESCRIPTION OF THE DRAWINGS

FIG. 4 is an enlarged sectional view taken substantially through a plane indicated by section line 4—4 in FIG. 2.

DETAILED DESCRIPTION OF THE PREFERRED EMBODIMENT

Figure 1:
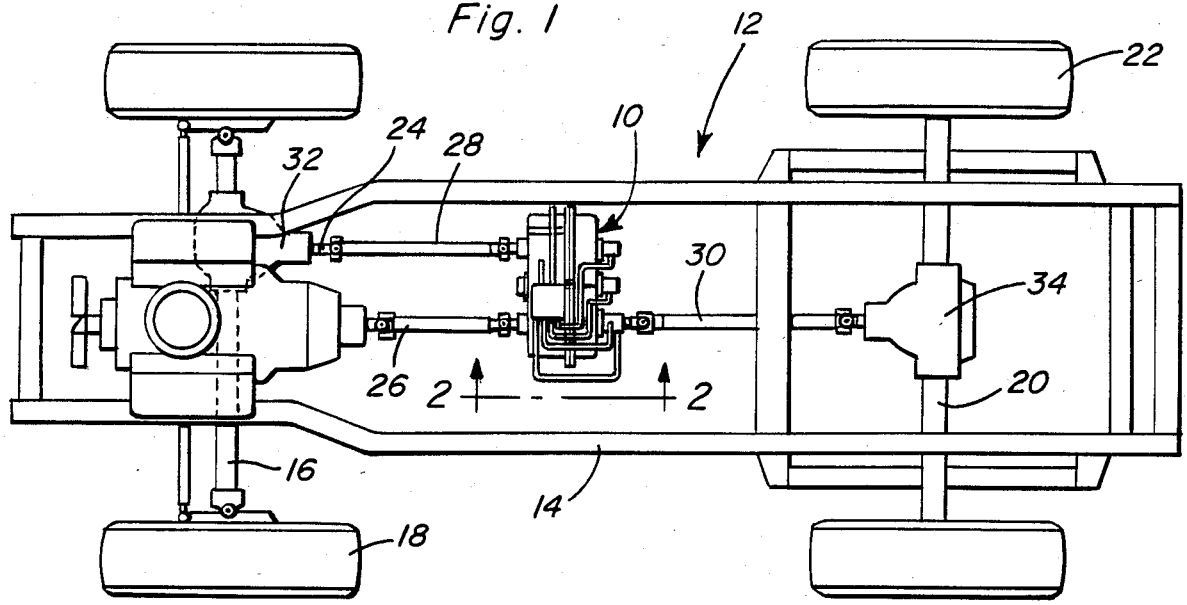
FIG. 1 is a top plan view of a typical vehicle installation for the transfer gear assembly of the present invention.

Referring now to the drawings in detail, FIG. 1 is illustrates a typical installation for a transfer gear transmission assembly 10 in an automotive vehicle generally referred to by reference numeral 12. The vehicle includes a chassis 14 supporting a front axle assembly 16 to which front dirigible wheels 18 are connected and a rear axle assembly 20 to which rear traction wheels 22 are connected. An internal combustion engine type of power plant 24 is supported on the front end portion of the chassis over the front axle assembly and is connected by a transmission 25 to a universal shaft 26. The torque transmitted from engine 24 by universal shaft 26 to the transfer gear assembly 10, is operative to propel the vehicle through universal shafts 28 and 30 coupling the assembly 10 to the axle assemblies through front and rear differentials 32 and 34. The foregoing arrangement for providing two-wheel or four-wheel propulsion of a vehicle is generally well known in the art.

Figure 2:
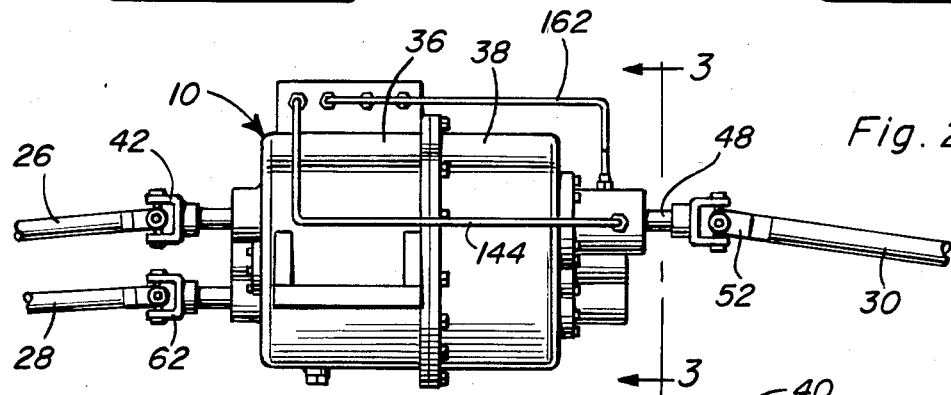
FIG. 2 is an enlarged partial side elevation view as seen from a plane indicated by section line 2—2 in FIG. 1.
Figure 3:
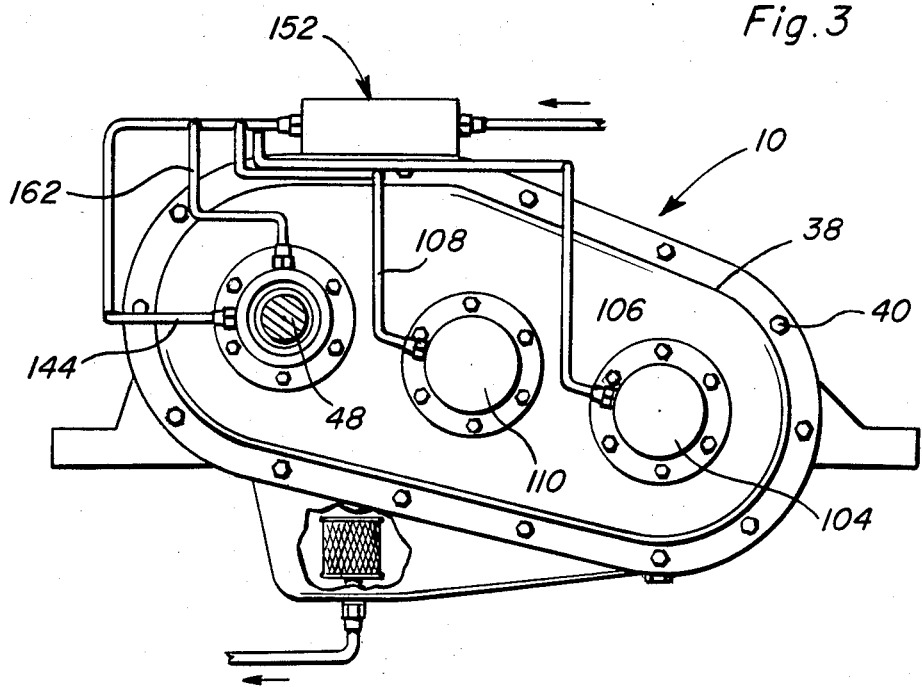
FIG. 3 is an end section view taken substantially through a plane indicated by section line 3—3 of FIG. 2.

In the illustrated embodiment of the invention, which resides in the transfer gear assembly 10, a transfer gear case is formed by two housing sections 36 and 38 having abutting flanges interconnected by a plurality of fasteners 40 as shown in FIGS. 2, 3 and 4. As more clearly seen in FIG. 2, the universal shaft 26 is coupled by a universal joint 42 to an input shaft 44. The input shaft is journaled within the housing section 36 of the gear transfer case by means of a sealed bearing assembly 46, in axial alignment with a driven shaft 48 journaled in the housing section 38 by spaced and sealed bearings within a bearing sleeve 50. The driven shaft 48 is coupled through a universal joint 52 to universal shaft 30 for transmitting propelling torque to the rear drive axle assembly 20. A counter shaft 54 is rotatably supported by a sealed bearing assembly 56 in parallel spaced relation to input shaft 44 within the gear transfer case while a second driven shaft 58 is rotatably supported in parallel spaced relation to shafts 44 and 54 by a sealed bearing assembly 60 in the housing section 36. The driven shaft 58 extends from the gear transfer case, as do the aligned shafts 44 and 48, to a universal joint 62 coupling it to the universal shaft 28 through which torque may be transmitted to the front drive axle assembly 16.

In accordance with the present invention, intermeshing countershaft gears 64 and 66 are respectively connected to the input shaft 44 and counter shaft 54 within housing section 36 as shown in FIG. 3. The gear 66 is substantially larger than gear 64 to provide a high reduction gear ratio, such as 3:1, between the input shaft and the counter shaft. Constant mesh gearing including intermeshed gears 68, 70 and 72 of substantially equal size are rotatably mounted within housing section 38. The gear 68 is directly connected to the rear axle driven shaft 48, while gears 70 and 72 are respectively connected to gear shafts 74 and 76 journaled in housing section 38 by spaced bearing assemblies 78 and 80 in axial alignment with counter shaft 54 and front axle driven shaft 58, respectively. The gears 70 and 72 may be respectively coupled to counter shaft 54 and driven shaft 58 by fluid power operated clutch devices 82 and 84. The gear 68 may be coupled to input shaft 44 by a clutch device 86.

The clutch devices 82 and 84 as shown in FIG. 4 are generally similar in construction and arrangement so that only one of the clutch devices 84 will be described in detail. An annular clutch housing 88 extends from the gear 72 to axially overlap a splined portion of the driven shaft 58 having an inner end portion 90 journaled by bearing 92 within a socket 94 formed in the adjacent inner end of gear shaft 76. A splined disc carrier hub 96 is connected to the splined portion of shaft 58 to support clutch discs 98 interleaved with clutch discs splined to the clutch housing 88. The clutch device is engaged in response to axial stacking of the clutch discs by an axial force applied by an annular piston 100 mounted by wiping seals for axial displacement within a fluid pressure chamber formed within the clutch housing about the socketed end portion of gear shaft 76. The piston 100 is spring biased as shown to a retracted position abutting the gear 72. Fluid actuating pressure is applied to the piston through a fluid passage bore 102 formed in the gear shaft which extends externally of housing section 38 into fluid manifold housing 104 bolted to housing section 38 by fasteners 105. Thus, pressurized fluid supplied to manifold housing 104 by a conduit 106 is operative to effect engagement of clutch devices 84 thereby coupling gear 72 to the driven shaft 58. Similarly, pressurized fluid supplied through conduit 108 to a manifold housing 110 is operative to effect engagement of clutch device 82 to thereby couple gear 70 to counter shaft 54. The clutch devices 82 and 84 are disengaged by spring bias when conduits 108 and 106 are depressurized.

Figure 5:
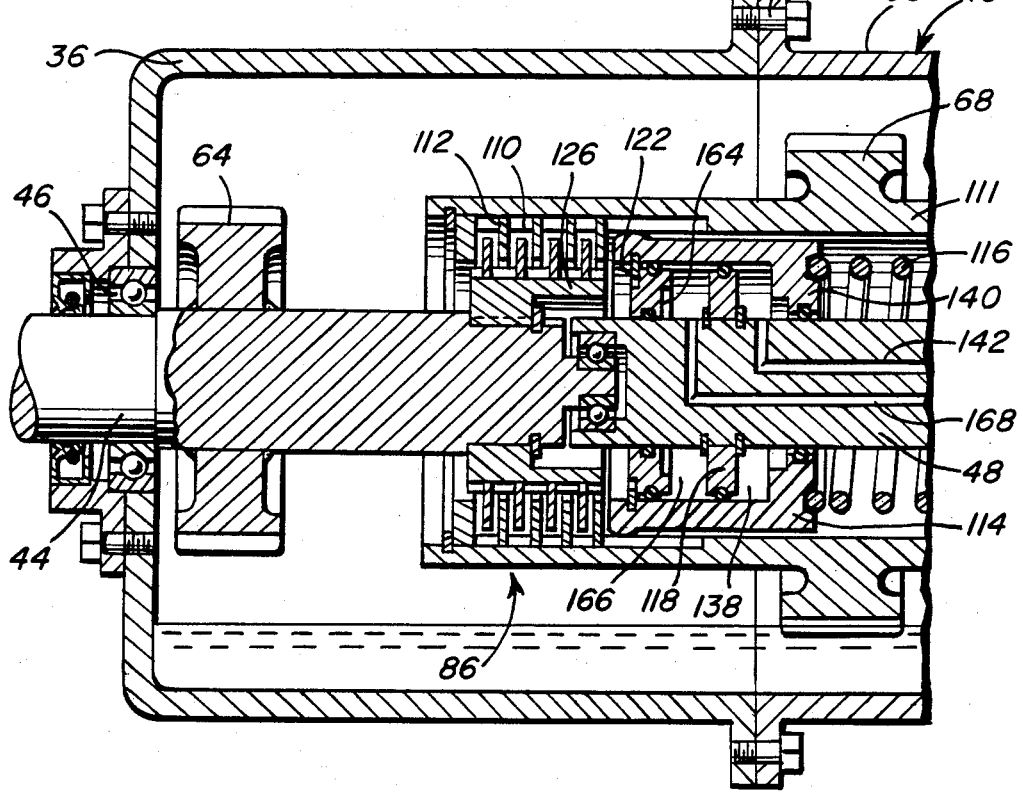
FIG. 5 is a partial sectional view taken substantially through a plane indicated by section line 5—5 in FIG. 4.
Figure 6:
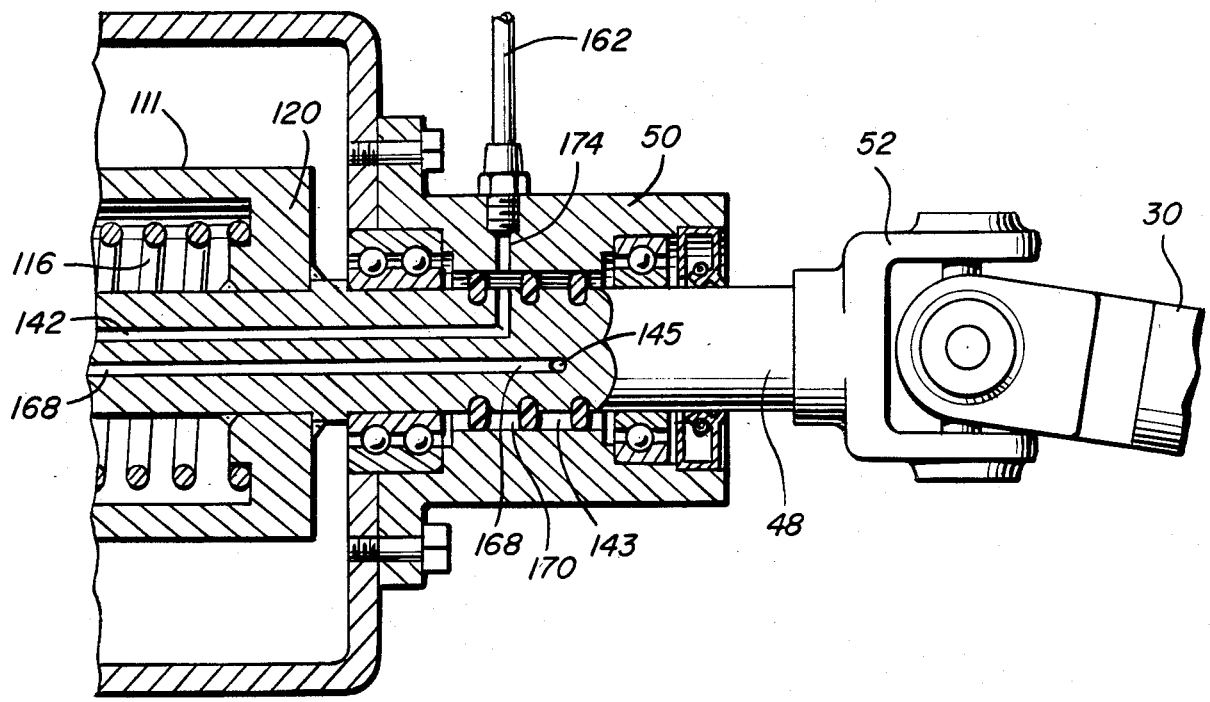
FIG. 6 is an enlarged partial section view taken substantially through a plane indicated by section 6—6 in FIG. 4.

In the illustrated embodiment as shown in FIGS. 4, 5 and 6, the clutch device 86 is of the reverse logic type, or one in which pressurized fluid effects disengagement. Thus, the clutch device 86 is normally engaged to couple shafts 44 and 48 under a spring bias with the power assist of pressurized fluid supplied to bearing sleeve 50 by conduit 162. The shaft 48 is connected to an axially elongated, rotatable clutch drum 111 on which the gear 68 is formed. The clutch drum axially overlaps an inner splined portion of shaft 44 within transfer case housing section 36. Interleaved clutch discs 112 and 110 are respectively splined to the clutch drum 111 and a hub 126 splined in axially fixed position to shaft 44 by snap rings. The clutch discs are engaged at one axial end by cylindrical actuator 114 under the bias of a spring 116 reacting against end wall 120 of the drum 111. A clutch apply chamber 166 is formed between a piston disc 164 and a sealing disc 118 axially fixed by snap rings to shaft 48 within the actuator 114, pressurized fluid is supplied to chamber 166 through bore 168 in shaft 48, annular manifold 143 between axially spaced seals 172 and a radial bore in bearing sleeve 50. A snap ring 122 limits movement of piston disc 164 in one direction relative to actuator 114 to exert a clutch apply force augmenting the bias of spring 116. A clutch disengaging force is applied to the end wall 140 of actuating member 114 by pressurized fluid in a clutch disengaging chamber 138 formed between end wall 140 and the disc 118. Fluid is supplied to chamber 138 by passage 142 in shaft 48, annular manifold 170 between spaced seals 172 in bearing sleeve 50, and bore 174 in the sleeve in communication with a supply conduit 162.

Figure 7:
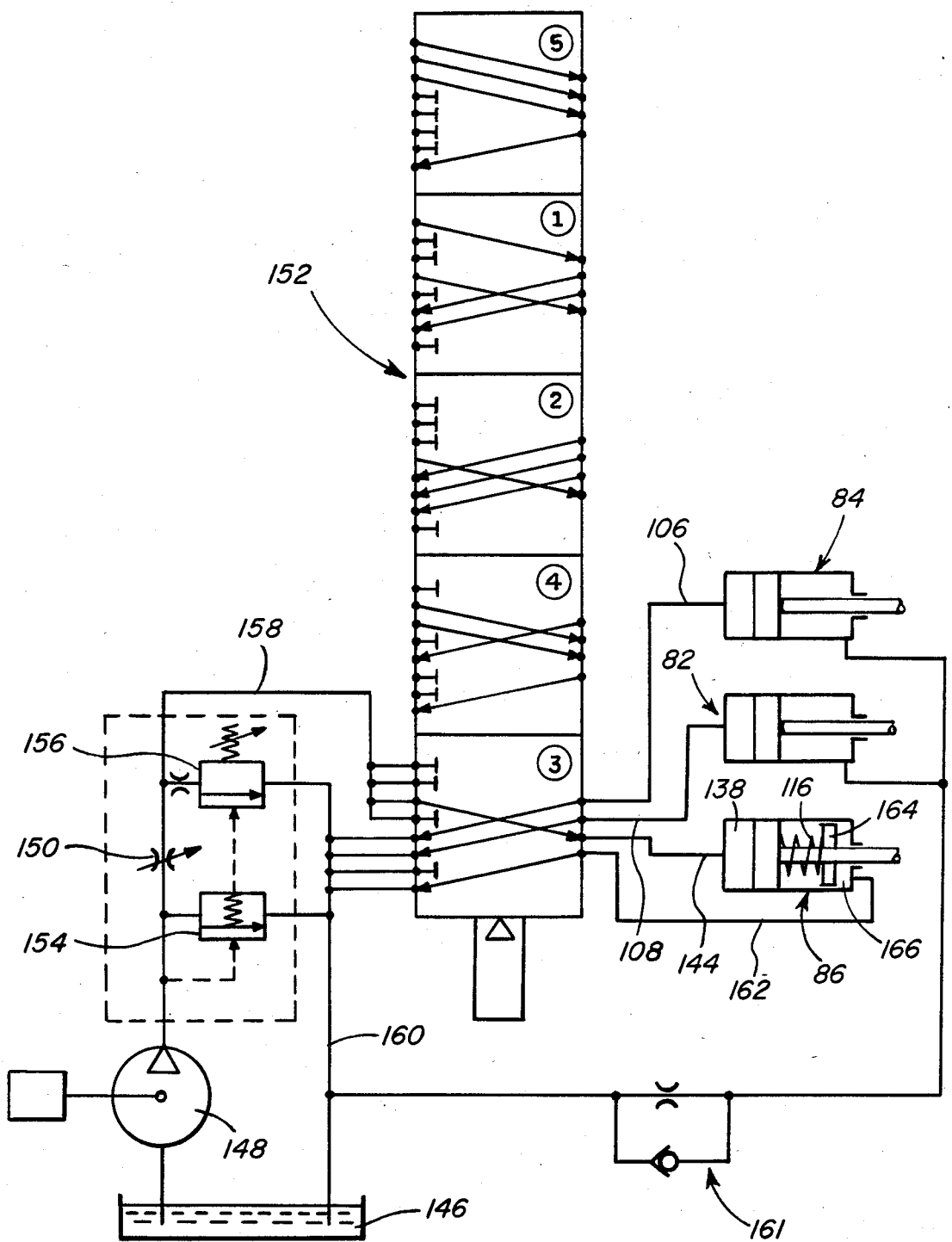
FIG. 7 is a fluid circuit diagram illustrating the control system associated with the present invention.

FIG. 7 diagrams the fluid pressure control system through which pressurized fluid is supplied and exhausted from the clutch device to control engagement and disengagement thereof. Fluid such as hydraulic transmission fluid, is derived from a sump 146 from which the fluid is withdrawn by an engine driven pump 148. Pressurized fluid is supplied by pump 148 at a controlled flow rate through an adjustable restrictor 150 to control valve assembly 152. Overload relief valve 154 and 156 limit the maximum pressure developed by the pump in pump pressure line 158 by returning excess fluid is sump 146 through return line 160. The flow of fluid being exhausted from the clutch devices to the return line 160 is regulated by regulator 161.

The control valve assembly 152 as shown in FIG. 7 is in its neutral position and has a total of five positions to which it may be sequentially displaced by the vehicle operator to control engagement and disengagement of the clutch devices 82, 84 and 86. In the No. 3 neutral position shown, the control valve connects the conduits 106, 108 and 162 to the return line 160 for disengagement of clutches 82 and 84, while clutch 86 is connected to the pressure line 158 through conduit 144 for disengagement thereof. With all clutches disengaged, the gear transmission assembly is in neutral with no propelling torque being transmitted. In the No. 4 position of the control valve, clutches 82 and 86 are pressurized and clutch 84 depressurized for two-wheel drive at a low drive ratio. In the No. 2 position, clutches 82 and 84 are depressurized and the power assist chamber 166 of clutch 86 is pressurized for two-wheel drive at a high or direct drive ratio. In No. 1 position, clutches 82 and 86 are depressurized and clutch 84 is pressurized for four-wheel drive at the high drive ratio. Finally, in the No. 5 position, all three clutches 82, 84 and 86 are pressurized and the power assist chamber 166 depressurized for four-wheel drive at the low drive ratio. The foregoing control sequence is summarized in the following table:

| SHIFTING POSITION | ENGAGED CLUTCHES 86 | 82 | 84 | (DRIVEN) AXLE DRIVE Front | Rear | DRIVE SPEED RATIO | DESCRIPTION |
| --- | --- | --- | --- | --- | --- | --- | --- |
| 1 | X | | X | X | X | direct | DIRECT 4 × 4 HIGH RANGE |
| 2 | X | | | | X | direct | DIRECT 2 × 4 HIGH RANGE |
| 3 | | | | | | neutral | NEUTRAL |
| 4 | | X | | | X | low | INDIRECT 2 × 4 LOW RANGE |
| 5 | | X | X | X | X | low | INDIRECT 4 × 4 LOW RANGE |

It will be apparent that in the No. 1 and No. 2 positions of control valve 152, the clutch 86 is engaged under its spring bias and fluid power assist thereby establishes a direct drive connection between the input shaft 44 and driven shaft 48 for rear axle drive at the high speed ratio. In the No. 1 and No. 5 positions, the clutch 84 is pressurized and thereby engaged to couple driven shaft 58 to gear 72 for drive of the front axle is a four wheel drive operation. The clutch 82 is pressurized and engaged only in the No. 4 and No. 5 positions for drive at a reduced speed ratio determined by the gear ratio of gears 64 and 66, with torque being transmitted to driven shaft 48 through gears 64, 66, 70 and 68 from the input shaft 44. With clutch 84 also engaged in the No. 5 position, the other driven shaft 58 is also driven at the reduced speed ratio from gear 70 through gear 72 in the four wheel drive operation. With the neutral, No. 3 position being located at one end of control valve travel as depicted in FIG. 7, shift between the drive positions may be effected without interruption in drive or propulsion of the vehicle.

As shown by dotted line in FIG. 4, a power take-off 176 may be provided in driving relation to the countershaft gear as a possible modification. Plural speed arrangements may also be provided in association with such power take-off through the vehicle transmission.

According to yet another alternative, gears 64 and 66 of the transfer case may be of the same size and interchangeable to provide an overdrive effect in vehicle installations having high horsepower and/or low differential gear ratios.

The foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

What is claimed as new is as follows:

1. In combination with a vehicle having at least two drive axles, and a transfer gear assembly through which the vehicle is propelled, including a transfer gear case, a pair of driven shafts rotatably mounted in non-aligned spaced relation in the gear case, means drivingly connecting the driven shafts to the drive axles, respectively, an input shaft and means rotatably mounting said input shaft in the gear case, the improvement comprising a counter shaft rotatably mounted in the gear case in spaced relation to said driven shafts and the input shaft, countershaft gear means drivingly connecting the input shaft to the counter shaft, constant mesh gear means drivingly connected to one of the driven shafts, controllable clutch means for respectively coupling the constant mesh gear means to the input shaft, the counter shaft and the other of the driven shafts, and selective control means operatively connected to said clutch means for transmitting torque to one or both of the drive axles at two different drive ratios without interrupting propulsion of the vehicle.

2. The improvement as defined in claim 1 wherein said rotatable mounting means supports the input shaft in axial alignment with said one of the driven shafts.

3. The improvement as defined in claim 2 wherein said counter shaft gear means comprises two meshing gears respectively connected to the input and counter shafts providing a reduction gear ratio therebetween.

4. The improvement as defined in claim 3 wherein said constant mesh gear means comprises three intermeshing gears one of which is connected to said one of the driven shafts.

5. The improvement as defined in claim 4 wherein said clutch means comprises three clutch devices respectively coupling the three intermeshing gears to the input shaft, the counter shaft and the other of the driven shafts.

6. The improvement as defined in claim 5 wherein said selective control means includes fluid power operating means for selectively engaging two of the clutch devices to respectively establish the two different drive ratios, and fluid power operating means for selectively disengaging the third of the clutch devices to drive one or both of the drive axles.

7. The improvement as defined in claim 1 wherein said constant mesh gear means comprises three intermeshing gears one of which is connected to said one of the driven shafts.

8. The improvement as defined in claim 7 wherein said clutch means comprises three clutch devices respectively coupling the three intermeshing gears to the input shaft, the counter shaft and the other of the driven shafts.

9. The improvement as defined in claim 8 wherein said selective control means includes fluid power operating means for selectively engaging two of the clutch devices to respectively establish the two different drive ratios, and fluid power operating means for selectively disengaging the third of the clutch devices to drive one or both of the drive axles.

10. The improvement as defined in claim 1 wherein said clutch means comprises two clutch devices for respectively establishing said two different drive ratios, and a third clutch device for effecting drive to one or both of the drive axles.

11. In a transmission having a housing, an input shaft, at least two non-aligned driven shafts, a counter shaft and means rotatably mounting said shafts in spaced relation within the housing, the improvement comprising counter shaft gear means drivingly connecting the input shaft to the countershaft, constant mesh gear means drivingly connected to one of the driven shafts, controllable clutch means for respectively coupling the constant mesh gear means to the input shaft, the counter shaft and the other of the driven shafts, and selective control means operatively connected to said clutch means for transmitting torque from the input shaft to one or both of the driven shafts at two different drive ratios.

12. The improvement as defined in claim 11 wherein said clutch means includes two clutch devices for establishing the two different drive ratios, a third clutch device operable in an engaged condition for transmitting torque to one or both of the driven shafts and spring means for biasing the third clutch device to the engaged condition.

13. The improvement as defined in claim 12 wherein said two clutch devices are fluid power engaged and said third clutch device is fluid power disengaged against the bias of the spring means.

14. The improvement as defined in claim 13 including fluid power assist means operable through the spring means for augmenting engagement of the third clutch device.

15. In a transmission having a housing, an input shaft, at least two driven shafts, a counter shaft, means rotatably mounting said shafts in spaced relation to each other within the housing and constant mesh gearing drivingly interconnecting all of said shafts, the improvement comprising drive control means for rendering the constant mesh gearing operative to transmit torque at different speed ratios to one or both of the driven shafts from the input shaft, said drive control means including clutch means selectively connecting the countershaft to the constant mesh gearing for transmission of torque at one of said different speed ratios.

16. The improvement as defined in claim 15 wherein said constant mesh gearing includes a gear selectively coupled to the counter shaft by the clutch means.

17. The improvement as defined in claim 16 wherein said two driven shafts are non-aligned.

18. The improvement as defined in claim 15 wherein said two driven shafts are non-aligned.

\* \* \* \* \*